United States Patent [19]
Miller et al.

[11] 3,778,194
[45] Dec. 11, 1973

[54] TURBOCHARGER STRUCTURE

[75] Inventors: Arthur J. Miller, Irwin; Robert A. Miller, Jeannette, both of Pa.

[73] Assignee: Carrier Corporation, Carrier Parkway, Syracuse, N.Y.

[22] Filed: Aug. 28, 1972

[21] Appl. No.: 284,181

[52] U.S. Cl. ............................. 417/407, 415/175
[51] Int. Cl. ............................................. F04b 17/00
[58] Field of Search ...................... 417/407; 415/175

[56] References Cited
UNITED STATES PATENTS

| | | |
|---|---|---|
| 2,646,210 | 7/1953 | Kohlmann et al. ................ 417/407 |
| 2,860,827 | 11/1958 | Egli .................................. 417/407 |
| 2,938,659 | 5/1960 | Judson et al. ..................... 417/407 |
| 2,973,136 | 2/1961 | Greenwald ......................... 417/407 |
| 3,054,554 | 9/1962 | Buchi ................................ 417/407 |
| 3,090,544 | 5/1963 | Wollenweber, Jr. ................ 417/407 |
| 3,303,994 | 2/1967 | Morooka ........................... 417/407 |
| 3,410,616 | 11/1968 | Dee .................................. 417/407 |
| 3,411,706 | 11/1968 | Wollenweber, Jr. ................ 417/407 |

Primary Examiner—C. J. Husar
Attorney—J. Raymond Curtin et al.

[57] ABSTRACT

The turbine-impeller shaft is journaled in a pair of bearings mounted in the intermediate section of the turbocharger casing. An oil seal is mounted in that section intermediate the turbine disc and one of the shaft bearings and a second seal is mounted intermediate the impeller and the other bearing. The seals are formed with radially disposed passages communicating with the area between the seals and the shaft. An air passage extends from the output of the compressor section to the seal passages for the discharge of air between the seals and the shaft for cooling the same and the lubricating oil. An oil return baffle is disposed intermediate the turbine disc and the contiguous seal. The baffle extends radially inwardly between the seal and the disc in overlying relation to the seal and the end of the shaft. The baffle serves to redirect any oil leakage passing between the seal and the shaft to an oil drain cavity.

2 Claims, 4 Drawing Figures

TURBOCHARGER STRUCTURE

BACKGROUND OF THE INVENTION

Due to the high speed rotation of the turbine-impeller shaft in turbochargers, the bearings are supplied with a constant flow of oil. Because of the high operating temperature, especially in the bearing in proximity to the turbine disc, the oil becomes carbonized and, as a result thereof, the non-contacting labyrinth type seal becomes clogged and ineffective. Also, leakage of the carbonized oil through the seal results in an accumulation of carbon buildup on the turbine disc next to the oil seal.

This invention has as an object a turbocharger structure wherein the oil seals are maintained in clean condition, the temperature of the oil being maintained below the carbonization temperature, and any oil leakage through the seal is returned in a direction from the turbine disc for deposit in the oil drain cavity.

SUMMARY OF THE INVENTION

Oil seals, preferably of the thread labyrinth type, are provided at the outer ends of the shaft bearings adjacent the turbine disc and the compressor impeller. The seals are formed with radially extending passages to which compressed air is supplied from the discharge of the compressor section. An oil return baffle is arranged between the turbine disc and the seal continguous thereto. The baffle is of annular form extending radially inwardly over the area between the seal and the shaft. The oil leakage to the area between the seal and the baffle is redirected to an oil drain cavity.

DESCRIPTION OF THE PREFERRED EMBODIMENT

Figure 1:
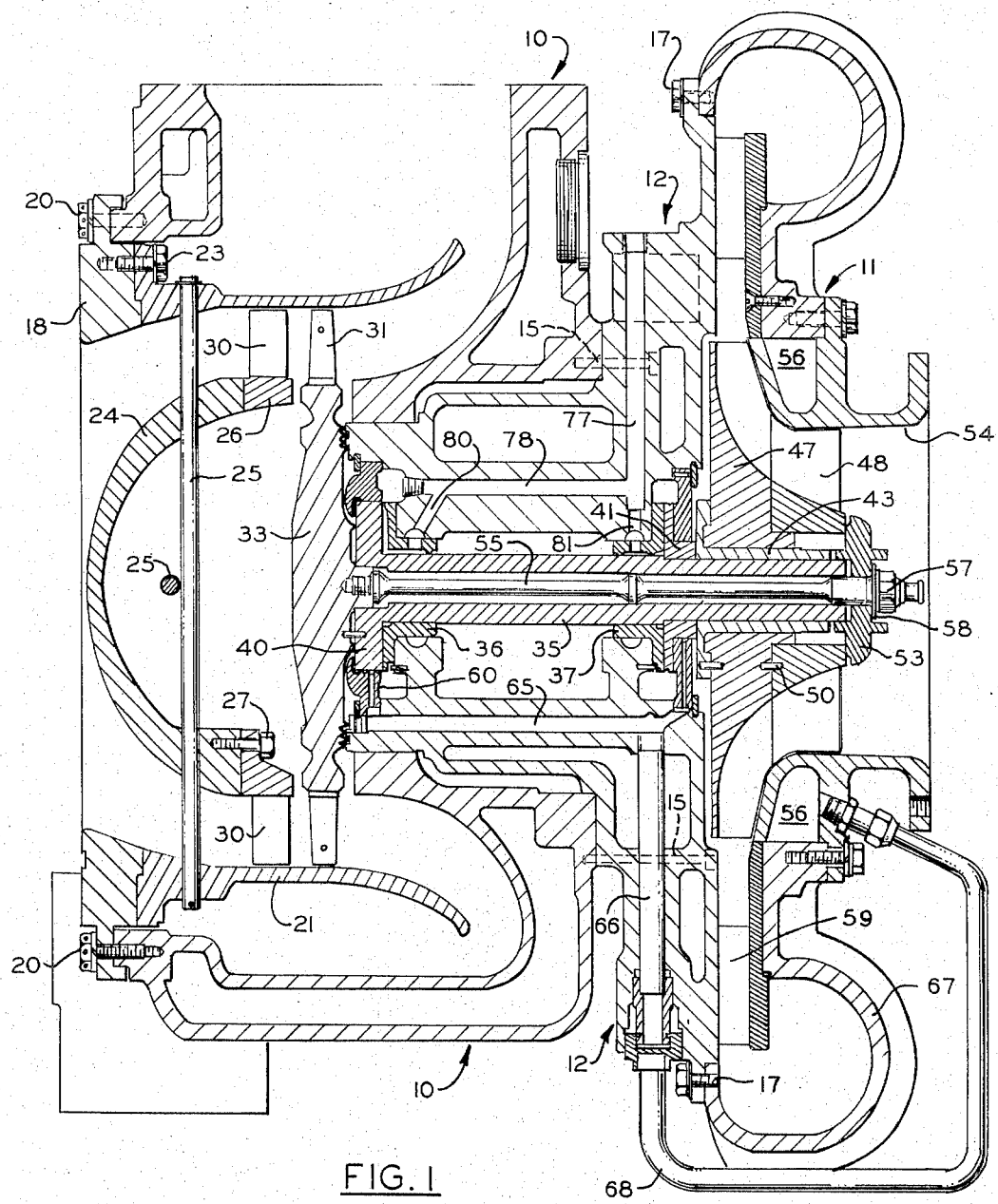
FIG. 1 is a lengthwise sectional view of a turbocharger embodying our invention.
Figure 2:
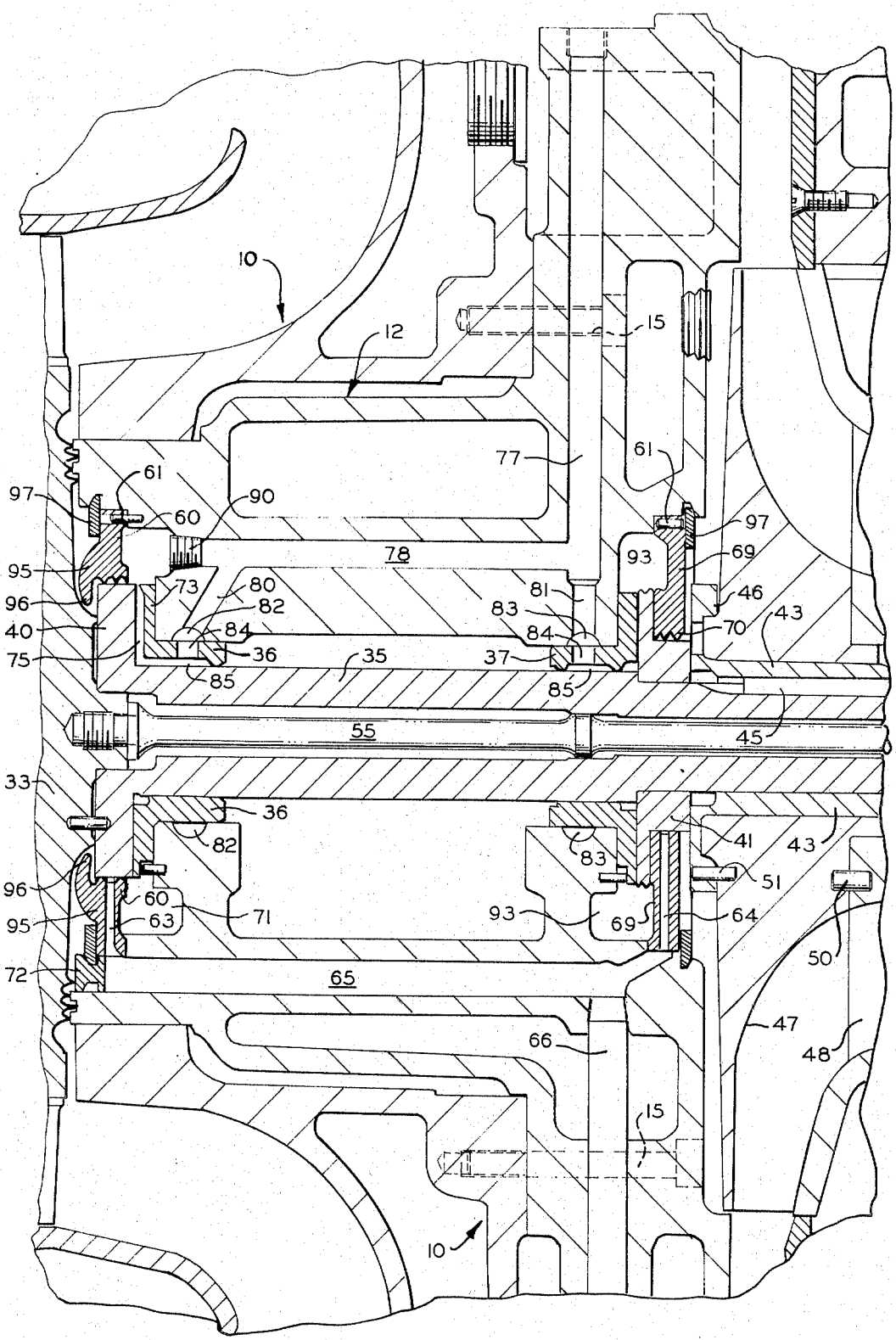
FIG. 2 is an enlarged view of the intermediate section structure shown in FIG. 1.

In the embodiment shown, the turbocharger consists of a casing, including a turbine section 10, a compressor section 11 and an intermediate section 12. The intermediate section 12 is fixed to the turbine section 10 by screws 15, and the compressor section 11 is attached to the intermediate section 12 by screws 17. An inlet ring 18 is fixed to the turbine section 10 by screws 20 and an inlet exhaust diffuser 21 is fixed to the ring 18 as by screws 23.

A nose piece 24 is mounted in the diffuser tube 21 by support rods 25. A nozzle ring 26 is fixed to the nose piece 24 by screws 27 and is formed with nozzle blades 30. The nose piece 24, in conjunction with the inlet diffuser 21, forms an annular passage for the flow of engine exhaust gases which are directed by the nozzle blades on blades 31 carried on the periphery of the turbine disc 33.

A tubular shaft 35 is journaled in bearings 36, 37 mounted in the intermediate casing 12. One end ot the shaft 35 is formed with an integral enlarged end portion 40. A collar 41 is mounted on the shaft 35 and positioned outwardly from the bearing 37 against a shoulder formed on the shaft 35. A sleeve 43 is fixed to the shaft 35 by a key 45. The inner end of the sleeve 43 is formed with a radial flange 46 abutting against the collar 41.

An impeller assembly, including an impeller 47 and an inducer 48, is fixed together by pins, one of which is shown at 50, and the impeller 47 is fixed to the flange 46 of sleeve 43 by pins, one of which is shown at 51. A washer cap 53 is arranged in abutting relation to the outer end of the hub portion of the inducer 48. A tie bolt 55 is threaded into the hub of the turbine disc 33 and extends axially through the shaft 35. The outer end of the tie bolt 55 is threaded to receive a nut 57. A washer 58 is interposed between the nut and the cap 53. With this arrangement, the turbine disc 33 and the impeller assembly are fixedly secured to the shaft. The compressor section includes an inlet 54 for the flow of air to the impeller 47. The inlet 54 is formed with an annular cavity 56 having an entrance at the outer edge of the periphery of the impeller 47. Impingement of engine exhaust gases on the blades of the turbine disc 33 drive the same, effecting rotation of impeller 47 for discharging air under pressure to the diffuser passage 59 and cavity 56.

An oil seal 60 of annular form encircles the shaft flange 40. The seal is mounted in the intermediate section 12 and is fixed thereto by pin 61. The seal 60 is formed with a radially disposed passage 63, having communication with the periphery of the shaft portion 40 and the bore of the seal.

Passage means is provided for connecting passage 63 with the pressurized air output from the impeller 47. This passage means has a horizontally disposed run 65 communicating with a vertically disposed run 66 which, in the embodiment shown, is connected to the compressor cavity 56 by a tube 68, see FIG. 1. The portion 65 of the passage means communicates with the seal passage 63. It also has communication with a passage 64 formed in the seal 69 encircling the collar 41 intermediate the bearing 37 and the impeller mounting sleeve 46. The end of the passage 65 at seal 60 is closed by a plug 72.

Figure 3:
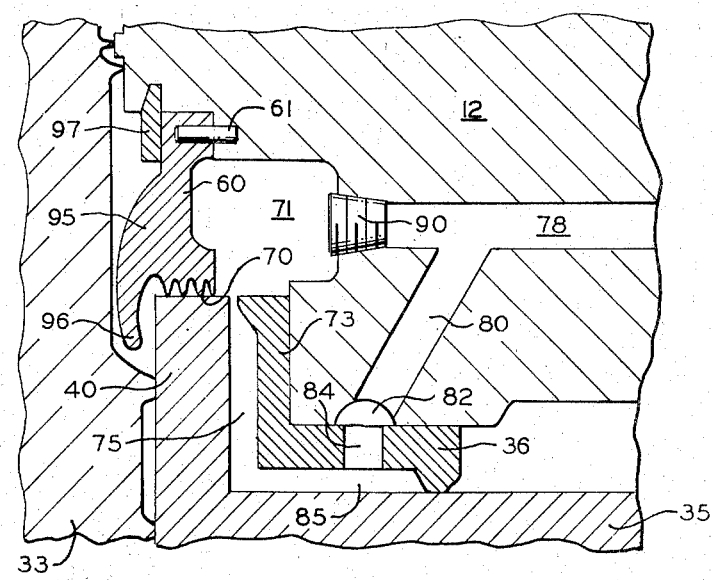
FIG. 3 is an enlarged view of the structure shown in the upper left portion of FIG. 2.
Figure 4:
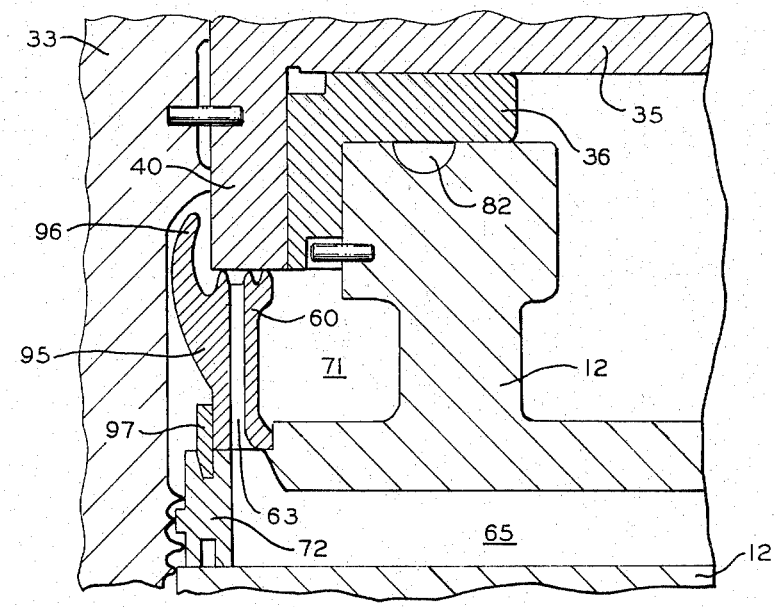
FIG. 4 is an enlarged view of the structure shown in the lower left portion of FIG. 2.

This arrangement functions to discharge cool air between the bores of the seals and the confronting areas of the shaft 35. The bore of the seals is formed with a thread labyrinth 70 which is of a hand that functions, during rotation of the shaft (see FIGS. 3 and 4), to move oil between the sleeve and the shaft in a direction toward oil drain cavities 71, 93.

The bearing 36 is formed with a radial flange 73 confronting the shaft portion 40. The face of the flange 73 is formed with a radially extending passage 75, the outer end of which communicates with the oil drain cavity 71.

The intermediate section 12 is formed with a radially disposed passage 77 communicating with a passage 78 extending in a direction parallel to the shaft 35, and communicating with branch passages 80, 81 for feeding oil to grooves 82, 83 encircling bearings 36, 37 which are formed with apertures 84 for the flow of oil from grooves 82, 83 to axially extending passages 85 for proper distribution of the oil between the bearings and the shaft. The passages 85 in the bearing 36 communicate with the radial passage 75. The outer end of the run 77 is supplied with oil under pressure. The end of the passage 78, beyond the branch 80, is closed by a plug 90.

During operation of the turbocharger, the oil serves to both lubricate and cool the bearings 36, 37, the oil from bearing 36 being discharged through the passage 75 to the oil drain cavity 71. We have discovered that if the air flow through the compressor inlet 54 contains moisture, the moisture will travel along the outer edges of the blades of the impeller 47, that is along the inner wall of the cavity 56, FIG. 1. Accordingly, most of the moisture will enter the cavity 56 rather than being discharged through the diffuser passage 59. During operation of the engine at normal full load, the passage of air through the passages 63, 64 formed in the seals 60, 69 is effective to maintain the oil at a temperature below which the oil carbonizes. Accordingly, the seals 60, 69 are maintained in clean and effective condition, preventing the leakage of oil between the seals and the shaft.

With the engine operating under overload condition, the turbine-impeller assembly is rotated at higher speed, increasing the pressure in cavity 56 and the air flow through the seal passages 63, 64. Also, the temperature increases in the turbine disc 33 and the shaft 40. Under this situation, the moisture in the air passing between the shaft and seals is flashed into steam effective to steam clean the labyrinth seals. Therefore, there is no accumulation of carbonized oil in the seals when the engine is operating under overload condition. There are applications wherein there are periods when the diesel engine is operated at idle, for example in railway locomotives.

Oil baffle means is provided to prevent the escape of oil that may leak between the seal 60 and the shaft during slow or idle speed operation of the engine.

The baffle means is of annular form, indicated at 95. It is formed with a lip portion 96 extending radially inwardly across the area between the bore of the seal and the shaft, and is placed in proximity to the end of the shaft 40. Preferably, the baffle 95 is formed integrally with the seal 60. The seal 60 is positioned in a counterbore formed in the intermediate section 12 and is retained therein by a snap ring 97.

Any oil leakage collecting between the baffle lip 96 and the end of the shaft is forced back through the seal into the oil drain cavity 71. This prevents the buildup of oil on the turbine disc 33 which at high temperature will carbonize the oil, producing an objectionable buildup on the turbine disc.

An oil baffle is not disposed intermediate the seal 69 and the impeller. The discharge of cool air through the seal passage 64 maintains the seal 69 and the collar 41 at a temperature below which oil carbonation takes place. It will be appreciated that the temperature in this portion of the structure is substantially lower than in the area of the seal 60 contiguous to the turbine discs. The seal 60 is also secured in place by a snap ring 97 and is restrained against rotation by a pin 61.

While we have described the preferred embodiments of our invention, it is to be understood that the invention is not limited thereto, but may be otherwise embodied within the scope of our following claims.

We claim:

1. A turbocharger comprising a casing formed with a turbine section, a compressor section having a discharge diffuser passage and an intermediate section, first and second spaced apart bearings mounted in said intermediate section, a shaft journaled in said bearings, a bladed turbine disc disposed in said turbine section and fixed to one end of the shaft contiguous to said first bearing, a centrifugal blower impeller fixed to the opposite end of the shaft contiguous to said second bearing and being disposed in said compressor section, said impeller being operable upon rotation of said shaft to discharge air under pressure to said diffuser passage, a first annular seal encircling said shaft intermediate said turbine disc and said first bearing, a second seal encircling said shaft intermediate said second bearing and said impeller, each of said seals being formed with a passage extending radially therethrough and communicating with the confronting surfaces of said shaft and seal, said intermediate section being provided with a gas passage means extending from said diffuser passage to the passage in each of said seals, said intermediate section having an oil passage means for supplying oil under pressure to the bore of each of said bearings, said intermediate section being provided with an oil drain cavity encircling each of said bearings, said cavities being located contiguous to said seals, an oil return baffle disposed intermediate said first seal and said turbine disc, said baffle extending radially inwardly over the end of said shaft and being spaced axially therefrom, said baffle being operable to redirect oil leakage from between said shaft and said seal to said oil drain cavity.

2. A turbocharger as set forth in claim 1 wherein said oil return baffle is formed integrally with said first seal.

* * * * *